United States Patent
Futamura et al.

(10) Patent No.: US 11,491,446 B2
(45) Date of Patent: Nov. 8, 2022

(54) VIRUS REMOVAL MEMBRANE AND METHOD FOR MANUFACTURING VIRUS REMOVAL MEMBRANE

(71) Applicant: ASAHI KASEI MEDICAL CO., LTD., Tokyo (JP)

(72) Inventors: Akika Futamura, Tokyo (JP); Yusuke Kon, Tokyo (JP); Tomoko Hongo, Tokyo (JP)

(73) Assignee: ASAHI KASEI MEDICAL CO., LTD., Tokyo (JP)

( * ) Notice: Subject to any disclaimer, the term of this patent is extended or adjusted under 35 U.S.C. 154(b) by 547 days.

(21) Appl. No.: 16/088,347

(22) PCT Filed: Mar. 30, 2017

(86) PCT No.: PCT/JP2017/013277
§ 371 (c)(1),
(2) Date: Sep. 25, 2018

(87) PCT Pub. No.: WO2017/170874
PCT Pub. Date: Oct. 5, 2017

(65) Prior Publication Data
US 2020/0298182 A1   Sep. 24, 2020

(30) Foreign Application Priority Data
Mar. 31, 2016   (JP) .............................. JP2016-072468

(51) Int. Cl.
*B01D 65/10*   (2006.01)
*B01D 67/00*   (2006.01)
(Continued)

(52) U.S. Cl.
CPC .......... *B01D 65/10* (2013.01); *B01D 67/0011* (2013.01); *B01D 67/0016* (2013.01);
(Continued)

(58) Field of Classification Search
CPC ............... B01D 65/10; B01D 67/0011; B01D 67/0016; B01D 69/02; B01D 69/06;
(Continued)

(56) References Cited

U.S. PATENT DOCUMENTS 4,581,140 A   4/1986   Manabe et al.
4,808,315 A   2/1989   Manabe et al.
(Continued)

FOREIGN PATENT DOCUMENTS

EP   0474267   3/1992
JP   S58-89627   5/1983
(Continued)

OTHER PUBLICATIONS

Supplementary European Search Report issued in European Patent Office (EPO) Patent Application No. 17775408.2, dated Mar. 29, 2019.
(Continued)

*Primary Examiner* — Krishnan S Menon
(74) *Attorney, Agent, or Firm* — Greenblum & Bernstein, P.L.C.

(57) ABSTRACT

A virus removal membrane includes cellulose, and a primary-side surface through which the protein-containing solution is to be applied and a secondary-side surface from which a permeate that has permeated the virus removal membrane is to be flowed, wherein a bubble point is 0.5 MPa or more and 1.0 MPa or less; and when a solution containing gold colloids having a diameter of 30 nm is applied through the primary-side surface to the virus removal membrane to allow the virus removal membrane to capture the gold colloids for measurement of brightness in a cross section of the virus removal membrane, a value obtained by dividing a standard deviation of a value of an area of a spectrum of variation in the brightness by an
(Continued)

average of the value of the area of the spectrum of variation in the brightness is 0.01 or more and 0.30 or less.

9 Claims, 8 Drawing Sheets

(51) Int. Cl.
*B01D 69/02* (2006.01)
*B01D 69/06* (2006.01)
*B01D 69/08* (2006.01)
*B01D 69/14* (2006.01)
*B01D 71/10* (2006.01)
*D01D 5/24* (2006.01)
*D01F 2/04* (2006.01)

(52) U.S. Cl.
CPC .............. *B01D 69/02* (2013.01); *B01D 69/06* (2013.01); *B01D 69/081* (2013.01); *B01D 69/141* (2013.01); *B01D 71/10* (2013.01); *D01D 5/24* (2013.01); *D01F 2/04* (2013.01); *B01D 2325/022* (2013.01)

(58) Field of Classification Search
CPC .... B01D 69/081; B01D 69/141; B01D 71/10; B01D 2325/022; B01D 69/08; B01D 69/12; D01D 5/24; D01F 2/04
See application file for complete search history.

(56) References Cited

U.S. PATENT DOCUMENTS

| | | | | |
|---|---|---|---|---|
| 4,857,196 A | * | 8/1989 | Manabe | ............... A61L 2/022 210/500.3 |
| 4,933,084 A | * | 6/1990 | Bandel | ............... B01D 69/087 210/321.73 |
| 2009/0110900 A1 | | 4/2009 | Yokota et al. | |
| 2010/0096328 A1 | | 4/2010 | Hamasaki et al. | |
| 2012/0125850 A1 | * | 5/2012 | Fujimura | ............... B01D 71/34 210/650 |
| 2017/0028360 A1 | | 2/2017 | Hamamoto et al. | |
| 2017/0029462 A1 | | 2/2017 | Hamamoto et al. | |

FOREIGN PATENT DOCUMENTS

| | | |
|---|---|---|
| JP | 58-114702 A | 7/1983 |
| JP | S59-225708 | 12/1984 |
| JP | 57-102205 A | 6/1986 |
| JP | 1-148305 A | 6/1989 |
| JP | 1-250408 A | 10/1989 |
| JP | 4-371221 A | 12/1992 |
| JP | 9-285723 A | 11/1997 |
| JP | 2008-284471 A | 11/2008 |
| JP | 2010-14564 A | 1/2010 |
| WO | 2015/156401 A1 | 10/2015 |
| WO | 2015/156403 A1 | 10/2015 |

OTHER PUBLICATIONS

Stefania Galdiero et al., "Silver Nanoparticles as Potential Antiviral Agents", Molecules 2011, 16, pp. 8894-8918.
Aviv Duek, "New and conventional pore size tests in virus removing menbrances", Water Research 46, 2012, pp. 2505-2514.
International Search Report received in PCT/JP2017/013277 and English language translation thereof, dated Jul. 4, 2017.
International Preliminary Report on Patentability received in PCT/JP2017/013277 and English language translation thereof, dated Oct. 2, 2018.

* cited by examiner

Portion where viruses are captured

Fig. 6

| | | | Example 1 | Example 2 | Example 3 | Comparative example 1 | Comparative example 2 | Comparative example 3 | Comparative example 4 | Comparative example 5 |
|---|---|---|---|---|---|---|---|---|---|---|
| Manufacturing conditions | Aging | Temperature °C | 32.5 | 30 | 35 | – | – | 50 | 35 | 32.5 |
| | | Time hr | 72 | 48 | 96 | – | – | 72 | 120 | 72 |
| | SiO$_2$ concentration | ppm | 20 | 5 | 50 | 1 | 40 | 1 | 20 | 200 |
| | External coagulation liquid | Acetone wt% | 37.5 | 37.5 | 37.5 | 37.5 | 37.5 | 37.5 | 37.5 | 37.5 |
| | | Ammonia wt% | 0.1 | 0.1 | 0.1 | 0.1 | 0.1 | 0.1 | 0.1 | 0.1 |
| | Internal coagulation liquid | Acetone wt% | 53 | 53 | 53 | 53 | 53 | 53 | 53 | 53 |
| | | Ammonia wt% | 0.65 | 0.65 | 0.65 | 0.65 | 0.65 | 0.65 | 0.65 | 0.65 |
| | Spinning temperature | °C | 26 | 26 | 26 | 26 | 26 | 26 | 26 | 26 |

Fig. 7

| Physical properties | | | Example 1 | Example 2 | Example 3 | Comparative example 1 | Comparative example 2 | Comparative example 3 | Comparative example 4 | Comparative example 5 |
|---|---|---|---|---|---|---|---|---|---|---|
| | Average inner diameter | μm | 332 | 327 | 329 | 328 | 331 | 342 | 314 | 325 |
| | Standard deviation of inner diameter | μm | 4.2 | 5.5 | 8.3 | 29.8 | 28.3 | 6.3 | 6.2 | 8.4 |
| | Average thickness | μm | 34.6 | 35.1 | 34.8 | 32.9 | 34.5 | 32.1 | 36.6 | 36.5 |
| | Standard deviation of thickness | μm | 1.5 | 2.7 | 3.5 | 9.9 | 10.1 | 11.4 | 10.3 | 3.7 |
| | Pure water permeation rate (before sterilization) | L/m²/hrs/0.1MPa | 241 | 197 | 283 | 268 | 298 | 312 | 322 | 168 |
| | Average pore size | nm | 35.0 | 32.3 | 36.5 | 34.6 | 36.5 | 37.4 | 37.7 | 30.8 |
| | Bubble point | MPa | 0.76 | 0.72 | 0.72 | 0.45 | 0.75 | 0.47 | 0.55 | 0.47 |
| | Fracture strength | MPa | 0.42 | 0.38 | 0.40 | 0.25 | 0.22 | 0.21 | 0.21 | 0.30 |

Fig. 8

| | | | | Example 1 | Example 2 | Example 3 | Comparative example 1 | Comparative example 2 | Comparative example 3 | Comparative example 4 | Comparative example 5 |
|---|---|---|---|---|---|---|---|---|---|---|---|
| Physical properties 2 | Gold colloid uniformity (variation coefficient) | 30 nm | Standard deviation/ average | 0.17 | 0.23 | 0.21 | 0.32 | 0.39 | 0.42 | 0.36 | 0.28 |
| | Thickness where gold colloids of 30 nm or more and 40 nm or less are captured | | μm | 18.5 | 19.2 | 19.5 | 20.4 | 22.9 | 21.8 | 20.8 | 20.2 |
| | Gradient property | 30 nm | % | 16.5–65.4 | 18.0–68.4 | 18.4–67.3 | 16.5–72.1 | 17.4–79.4 | 17.5–75.1 | 19.1–72.2 | 18.0–71.1 |
| | | 40 nm | % | 11.3–34.1 | 12.2–34.2 | 9.6–34.4 | 12.3–34.9 | 12.2–35.5 | 11.1–36.1 | 11.3–35.6 | 11.9–34.2 |
| | | 50 nm | % | 9.0–29.8 | 8.5–29.4 | 6.6–27.5 | 9.0–28.9 | 8.7–28.8 | 9.3–30.4 | 8.9–31.2 | 6.9–28.8 |
| Capacity | Logarithmic removal rate of gold colloids | 50 nm | | ≧1.4 | ≧1.4 | ≧1.4 | ≧1.4 | ≧1.4 | ≧1.4 | ≧1.4 | ≧1.4 |
| | | 40 nm | | ≧1.4 | ≧1.4 | ≧1.4 | ≧1.4 | ≧1.4 | ≧1.4 | ≧1.4 | ≧1.4 |
| | | 30 nm | | ≧1.4 | ≧1.4 | ≧1.4 | 1.25 | ≧1.4 | 0.8 | 0.7 | 0.8 |
| | | 20 nm | | 0.02 | 0.03 | 0.02 | 0.02 | 0.02 | 0.02 | 0.02 | 0.02 |
| | BVDV-LRV | | | ≧5.83 | ≧5.83 | ≧5.83 | 3.66 | 3.83 | 3.33 | 2.83 | 3.66 |

VIRUS REMOVAL MEMBRANE AND METHOD FOR MANUFACTURING VIRUS REMOVAL MEMBRANE

TECHNICAL FIELD

The present invention relates to a virus removal membrane for removing viruses from a solution, and a method for manufacturing a virus removal membrane.

BACKGROUND ART

In recent years, a measure to enhance virus safety has been necessary for not only plasma derivatives derived from human blood, but also bio-pharmaceuticals. Therefore, pharmaceutical manufacturers have studied to introduce a virus removal/inactivation step in a manufacturing process. In particular, a virus removal method by filtration with a virus removal membrane is an effective method that can provide virus reduction without denaturing useful proteins.

For example, Patent Literature 1 discloses a polymeric porous hollow fiber membrane having a pore structure where the in-plane porosity is initially decreased from the inner wall surface of the membrane towards the inner wall portion of the membrane, passes through at least one local minimum and thereafter is again increased on the outer wall portion of the membrane (hereinafter, also referred to as "gradient structure"), and a virus removal method including filtering an aqueous protein solution with the membrane. A virus removal membrane having such a gradient structure and having a specified average pore size, when used for removal of viruses from an aqueous protein solution, is considered to be suitable for removal of such viruses at a high removal rate and for recovery of a protein at a high permeation efficiency without denaturing any protein.

Patent Literature 2 discloses a method for manufacturing a hollow fiber membrane, in which a cuprammonium cellulose solution can be solidified in a U-shaped tube to thereby suppress structure breakage due to stretching during structure formation in microphase separation as much as possible, thereby allowing high virus removal properties to be achieved. Patent Literature 4 discloses a virus removal membrane suitable for removal of parvoviruses, the membrane having an average pore size of 13 nm or more and 21 nm or less. Patent Literature 3 discloses characteristic evaluation of a virus removal membrane by use of viruses and proteins.

CITATION LIST

Patent Literatures

Patent Literature 1: Japanese Patent Laid-Open No. H01-148305
Patent Literature 2: Japanese Patent Laid-Open No. H04-371221
Patent Literature 3: International Publication No. WO 2015/156401
Patent Literature 4: Japanese Patent Laid-Open No. 2010-14564

SUMMARY OF INVENTION

Technical Problem

A virus removal membrane is demanded to be high in virus removal capability, high in filtration capability with clogging of the membrane in filtration being suppressed, and small in the differences in virus removal capability and filtration time between products. An object of the present invention is then to provide a virus removal membrane small in the difference in filtration capability between products and thus high in safety, and a method for manufacturing a virus removal membrane.

Solution to Problem

An aspect of the present invention provides a virus removal membrane for removing viruses from a protein-containing solution. The virus removal membrane includes cellulose, and a primary-side surface through which the protein-containing solution is to be applied and a secondary-side surface from which a permeate that has permeated the virus removal membrane is to be flowed, in which a bubble point is 0.5 MPa or more and 1.0 MPa or less; when a solution containing gold colloids having a diameter of 30 nm are applied through the primary-side surface to the virus removal membrane to allow the virus removal membrane to capture the gold colloids for measurement of brightness in a cross section of the virus removal membrane, a value obtained by dividing a standard deviation of a value of an area of a spectrum of variation in the brightness by an average of the value of the area of the spectrum of variation in the brightness is 0.01 or more and 0.30 or less; and a thickness of a site where gold colloids having a diameter of 30 nm or more and 40 nm or less are captured in the cross section of the virus removal membrane in a wet state is 17.0 μm or more and 20.0 μm or less.

In the virus removal membrane, a site where gold colloids having a diameter of 50 nm are captured may be located at a place corresponding to 5% or more and 35% or less of a thickness of the virus removal membrane from the primary-side surface, a site where gold colloids having a diameter of 40 nm are captured may be located at a place corresponding to 8% or more and 50% or less of the membrane thickness from the primary-side surface, and a site where gold colloids having a diameter of 30 nm are captured may be located at a place corresponding to 10% or more and 80% or less of the membrane thickness from the primary-side surface, in the cross section of the virus removal membrane in a wet state.

In the virus removal membrane, a logarithmic removal rate of gold colloids having a diameter of 40 nm may be 1.00 or more, a logarithmic removal rate of gold colloids having a diameter of 30 nm may be 1.00 or more, and a logarithmic removal rate of gold colloids having a diameter of 20 nm may be less than 0.10. No gold colloids having a diameter of 20 nm may be captured.

In the virus removal membrane, a pore size may be 32.0 nm or more and 38.0 nm or less. The pore size may be decreased and then increased from the primary-side surface towards the secondary-side surface in the cross section of the virus removal membrane. The site where gold colloids having a diameter of 30 nm are captured may encompass a portion where the pore size is a minimum value.

A thickness of the virus removal membrane in a dry state may be 25.0 μm or more and 45.0 μm or less. A standard deviation of the thickness may be 5.0 μm or less.

In the virus removal membrane, the bubble point may be 0.7 MPa or more and 1.0 MPa or less.

In the virus removal membrane, a pure water permeation rate may be 100 L/m$^2$/hrs/0.1 MPa or more and 500 L/m$^2$/hrs/0.1 MPa or less.

The virus removal membrane may be a flat membrane. Alternatively, the virus removal membrane may be a hollow fiber membrane. In this case, an inner diameter in a dry state may be from 250 µm to 400 µm. A standard deviation of the inner diameter may be 15.0 µm or less.

In the virus removal membrane, a logarithmic removal rate (LRV) of viruses of 40 nm or more may be 4.0 or more. A logarithmic removal rate (LRV) of bovine viral diarrhea viruses (BVDV) may be 4.0 or more.

An aspect of the present invention also provides a method for manufacturing a virus removal membrane, the method including an aging step of maintaining a raw spinning solution including cellulose, copper and silicon dioxide at 30° C. or higher and 40° C. or lower, and a membrane formation step of forming a membrane by use of the raw spinning solution.

In the method for manufacturing the virus removal membrane, the aging step may be performed for 45 hours or more and 100 hours or less.

In the membrane formation step in the method for manufacturing the virus removal membrane, a cellulose concentration may be 6.0% by weight or more and 8.5% by weight or less. A ratio of a copper concentration to the cellulose concentration may be 0.30 or more and 0.40 or less. A silicon dioxide concentration may be 5 ppm or more and 100 ppm or less.

In the method for manufacturing the virus removal membrane, the raw spinning solution may further include ammonia, and a ratio of an ammonia concentration to a cellulose concentration in the membrane formation step may be 0.6 or more and 1.0 or less.

In the membrane formation step in the method for manufacturing the virus removal membrane, the raw spinning solution may be discharged to a coagulation solution. The raw spinning solution may be discharged using an annular spinning outlet. Alternatively, the raw spinning solution may be cast on a support and then immersed in a coagulation solution.

Advantageous Effects of Invention

The present invention makes it possible to provide a virus removal membrane small in the difference in filtration capability between products and thus high in safety, and a method for manufacturing a virus removal membrane.

BRIEF DESCRIPTION OF DRAWINGS

FIG. 6 is a table showing manufacturing conditions of a virus removal membrane according to each Example of the present invention.

FIG. 7 is a table showing evaluation results of a virus removal membrane according to each Example of the present invention.

FIG. 8 is a table showing evaluation results of a virus removal membrane according to each Comparative Example of the present invention.

DESCRIPTION OF EMBODIMENTS

Hereinafter, embodiments of the present invention are described. In the following description of drawings, the same or similar part is represented by the same or similar reference sign. The drawings, however, are schematic, and are not accurately illustrated by specific dimensions and the like. Accordingly, specific dimensions and the like are required to be understood in view of the following description, and any part whose dimension relationship and ratio are different among the drawings is, of course, included.

Figure 1:
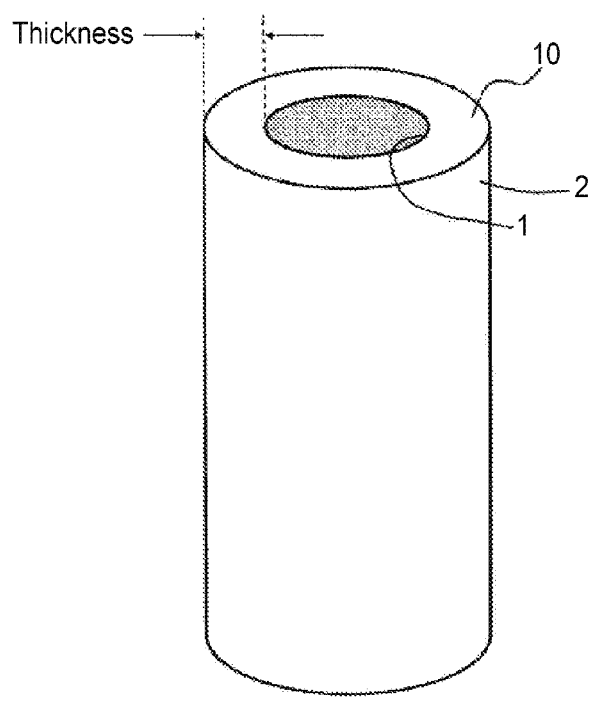
FIG. 1 is a schematic view of a virus removal membrane having a hollow fiber membrane shape, according to an embodiment of the present invention.

As illustrated in FIG. 1, a virus removal membrane 10 for removing viruses from a protein-containing solution, according to an embodiment, includes a primary-side surface 1 through which the protein-containing solution is to be applied, and a secondary-side surface 2 from which a permeate that has permeated the virus removal membrane 10 is to be flowed. The bubble point measured in the virus removal membrane 10 is 0.5 MPa or more and 1.0 MPa or less, 0.6 MPa or more and 1.0 MPa or less, or 0.7 MPa or more and 1.0 MPa or less.

Viruses to be removed by the virus removal membrane 10 have a diameter of, for example, 30 nm or more, 35 nm or more, 40 nm or more, or 50 nm or more, and 200 nm or less, 150 nm or less, 100 nm or less, or 70 nm or less. Specific examples of the virus include bovine viral diarrhea virus (BVDV) and hepatitis B virus. Bovine viral diarrhea virus has a diameter of about 50 nm to 70 nm. Hepatitis B virus has a diameter of about 42 nm.

Figure 2:
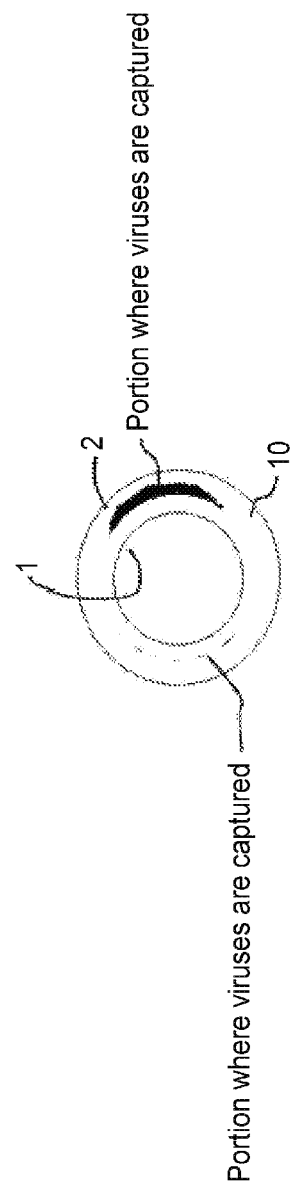
FIG. 2 is a schematic view of a virus capture site in a virus removal membrane having a hollow fiber membrane shape, according to Reference Example of the present invention.
Figure 3:
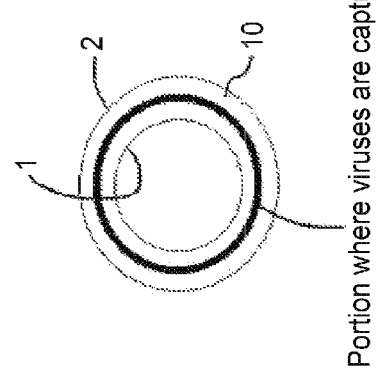
FIG. 3 is a schematic view of a virus capture site in a virus removal membrane having a hollow fiber membrane shape, according to an embodiment of the present invention.

The virus removal membrane 10 has a virus capture site, where viruses are captured, in the cross section thereof. In the virus removal membrane 10, the amount of viruses captured on the virus capture site in the cross section is preferably uniform regardless of a point on a filtration surface (primary-side surface 1) which the solution enters. The reason for this is because, if the amount of viruses captured in the virus removal membrane 10 is ununiform depending on a point on the filtration surface, the solution is concentrated at certain point on the filtration surface to partially increase the amount of viruses to be loaded at the point and thus viruses may be leaked from the point in a large capacity filtration under a high pressure condition. When the virus removal membrane 10 has a hollow fiber membrane shape, the amount of viruses captured in the virus capture site is not ununiform as illustrated in FIG. 2, but preferably uniform as illustrated in FIG. 3, in the periphery direction in the cross section perpendicular to the fiber length direction.

Furthermore, in the virus removal membrane 10, the thickness of a portion where viruses are captured is preferably uniform in the virus capture site. When the virus removal membrane 10 has a hollow fiber membrane shape, the thickness of the virus capture site is preferably uniform in the periphery direction. When the thickness of the virus capture site is uniform, the solution can be uniformly spread in the periphery direction to result in reduction in virus leakage.

The structure of the virus removal membrane 10 is preferably an asymmetric structure where the pore size of a pore is decreased and then increased from the primary-side surface towards the secondary-side surface. The virus capture site encompasses a portion where the pore size of a pore is a minimum value, in the cross section of the virus removal membrane 10. The structure including a portion where the pore size of a pore is a minimum value tends to be high in virus removal capability.

Here, it may be difficult to visually detect viruses captured by the virus removal membrane 10. On the contrary, a gold colloid does not allow light to transmit while it has a diameter comparable with a size of a virus, and therefore it is visually detected easily. Therefore, characteristics of the virus removal membrane 10 can be evaluated by, for example, filtering a gold colloid-containing solution by the virus removal membrane 10, and thereafter measuring the relative brightness of a gold colloid capture site, where gold colloids are captured by the virus removal membrane 10, in the cross section of the virus removal membrane 10.

With respect to the virus removal membrane 10 according to the embodiment, when a solution containing gold colloids having a diameter of 30 nm is applied through the primary-side surface 1 to the virus removal membrane 10 to allow the virus removal membrane 10 to capture the gold colloids for measurement of brightness in the cross section of the virus removal membrane 10, the value obtained by dividing the standard deviation of the value of the area of the spectrum of variation in the brightness by the average of the value of the area of the spectrum of variation in the brightness is 0.01 or more and 0.30 or less. The value means the variation coefficient of the amount of captured gold colloids in the virus removal membrane 10. A smaller variation coefficient means higher uniformity of the amount of the captured gold colloids on the gold colloid capture site in the virus removal membrane 10 and higher water permeation capability and virus removal ability of the virus removal membrane.

In the virus removal membrane 10 according to the embodiment, the value indicating the variation coefficient is 0.01 or more and 0.30 or less, 0.01 or more and 0.29 or less, 0.01 or more and 0.28 or less, 0.01 or more and 0.27 or less, 0.01 or more and 0.26 or less, or 0.01 or more and 0.25 or less. The measurement limit of the variation coefficient is less than 0.01. A variation coefficient of more than 0.30 may cause the solution to be concentrated at at least certain one point in the periphery direction of the membrane to thereby result in virus leakage.

A variation coefficient of 0.01 or more and 0.30 or less can allow viruses to be uniformly captured on the virus capture site of the membrane (in the periphery direction with respect to a hollow fiber membrane), and allow high virus removal capability to be maintained even in the case of an increase in the total amount of viruses to be loaded to the virus removal membrane (the amount of viruses to be spiked to a pharmaceutical protein, or the total amount thereof to be filtered off).

The variation coefficient is measured by, for example, the following method. A piece is cut out from the virus removal membrane applied to filtration of a gold colloid solution, and the brightness profile at each of a plurality of points in a part stained by gold colloids in the cross section of the piece is measured by an optical microscope. Since gold colloids absorb light, variation in the brightness depends on the amount of the captured gold colloids. Herein, a background noise may be, if necessary, removed from the brightness profile. Thereafter, a graph with the thickness represented on the horizontal axis and variation in the brightness represented on the vertical axis is created, and the area of the spectrum of variation in the brightness presented on the graph is calculated. Furthermore, the value obtained by dividing the standard deviation of the area of the spectrum of variation in the brightness at the plurality of points by the average of the area of the spectrum of variation in the brightness at the plurality of points is calculated as the value indicating the variation coefficient of the amount of the captured gold colloids on the gold colloid capture site in the virus removal membrane 10.

The thickness of the site, where gold colloids having a diameter of 30 nm or more and 40 nm or less are captured, in the cross section of the virus removal membrane 10, in a wet state is 17.0 µm or more and 20.0 µm or less, 17.5 µm or more and 19.8 µm or less, or 18.0 µm or more and 19.6 µm or less. When the thickness of the gold colloid capture site is more than 20.0 µm, efficiency of filtration of not only a gold colloid-containing solution, but also a virus-containing solution tends to be reduced. When the thickness is less than 17.0 µm, an increase in the total amount of viruses to be loaded to the virus removal membrane (the amount of viruses to be spiked to a pharmaceutical protein, or the total amount thereof to be filtered off) may cause virus leakage.

The site where gold colloids having each of a diameter of 30 nm, 40 nm, and 50 nm are captured is subjected to, for example, measurement according to the following method. A piece is cut out from the virus removal membrane applied to filtration of a solution of gold colloids having each of a diameter of 30 nm, 40 nm, and 50 nm. The brightness profile at each of a plurality of points in a part stained by gold colloids in the cross section of the piece is measured by an optical microscope. Herein, a first distance "a" from the primary-side surface 1 of the virus removal membrane 10 to a part on the gold colloid capture site where is closest to the primary-side surface is measured in the thickness direction. In addition, a second distance "b" from the primary-side surface 1 of the virus removal membrane 10 to a part on the gold colloid capture site where is closest to the secondary-side surface 2 is measured in the thickness direction.

Next, the value "A" (=a/c (expressed in percentage)) obtained by division of the first distance "a" by the thickness "c" of the wet virus removal membrane and expressed in percentage is calculated at each of the plurality of points, and the average of the value "A" at the plurality of points is calculated as a first attainment level. In addition, the value "B" (=b/c (expressed in percentage)) obtained by division of the second distance "b" by the thickness "c" of the wet virus removal membrane and expressed in percentage is calculated at each of the plurality of points, and the average of the value "B" at the plurality of points is calculated as a second attainment level.

Furthermore, as represented by the following expression (1), the value obtained by multiplication of the difference between the average "$B_{30}$" of the second attainment level in the virus removal membrane applied to capturing of the gold colloids having the diameter of 30 nm by filtration, and the average "$A_{40}$" of the first attainment level in the virus removal membrane applied to capturing of the gold colloids having the diameter of 40 nm by filtration, by the average "$C_{AVE}$" of the average "$C_{30}$" of the thickness of the wet virus removal membrane applied to capturing of the gold colloids having the diameter of 30 nm by filtration and the average $C_{40}$ of the thickness of the wet virus removal membrane applied to capturing of the gold colloids having the diameter of 40 nm by filtration is calculated as the thickness "T" of the site, where gold colloids having a diameter of 30 nm or more and 40 nm or less are captured, in the cross section of the virus removal membrane 10 in flowing of the gold colloids having the diameter of 30 nm and the gold colloids having the diameter of 40 nm.

$$T = (B_{30} - A_{40}) \times C_{AVE} \qquad (1)$$

In the above method, the site where the gold colloids having the diameter of 30 nm or more and 40 nm or less are captured is determined as the thickness of a region between the first attainment position in the virus removal membrane applied to capturing of the gold colloids having the diameter of 40 nm by filtration and the second attainment position in the virus removal membrane applied to capturing of the gold colloids having the diameter of 30 nm by filtration, and it is confirmed that gold colloids having the diameter of 30 nm or more and 40 nm or less, except for the margin of error, are captured within the region.

When a solution containing gold colloids having a diameter of 50 nm is filtered by the virus removal membrane 10, the site where the gold colloids having the diameter of 50 nm are captured in the cross section of the virus removal membrane 10 in a wet state is located at a place corresponding to, for example, 5% or more and 35% or less, or 6% or more and 30% or less of the membrane thickness from the primary-side surface 1 in measurement with an optical microscope. A membrane where the gold colloids having the diameter of 50 nm are captured at a site corresponding to less than 5% of the membrane thickness from the primary-side surface causes viruses and impurities to be captured at a position closer to the primary-side surface of the membrane and may cause clogging to more occur. A membrane where the gold colloids having the diameter of 50 nm are captured at a site corresponding to more than 35% of the membrane thickness from the primary-side surface causes the target viruses to be captured at a position closer to the secondary-side surface of the membrane and thus there is a possibility that the viruses cannot be captured.

Herein, even when a small amount of the gold colloids having the diameter of 50 nm are captured in a region of less than 5% or more than 35% of the membrane thickness from the primary-side surface 1, a case where the absolute value of the spectrum of variation in the brightness, determined by subtracting the brightness profile measured from a constant (255) in measurement with an optical microscope, is 10% or less relative to the maximum of the absolute value of the spectrum can be regarded as being within the margin of error with respect to capturing of gold colloids in the region in terms of virus removal ability of the virus removal membrane. Accordingly, in this case, the site where the gold colloids having the diameter of 50 nm are captured can be regarded as being located at a place corresponding to 5% or more and 35% or less of the membrane thickness from the primary-side surface 1.

When a solution containing gold colloids having a diameter of 40 nm is filtered by the virus removal membrane 10, a site where the gold colloids having the diameter of 40 nm are captured in the cross section of the virus removal membrane 10 in a wet state is located at a place corresponding to, for example, 8% or more and 50% or less, or 9% or more and 40% or less of the membrane thickness from the primary-side surface 1 in measurement with an optical microscope. A membrane where the gold colloids having the diameter of 40 nm are captured at a site corresponding to less than 8% of the membrane thickness from the primary-side surface causes viruses and impurities to be captured at a position closer to the primary-side surface of the membrane, and may cause clogging to more occur. A membrane where the gold colloids having the diameter of 40 nm are captured at a site corresponding to more than 50% of the membrane thickness from the primary-side surface causes the target viruses to be captured at a position closer to the secondary-side surface of the membrane and thus there is a possibility that the viruses cannot be captured.

Herein, even when gold colloids are observed in a region of less than 8% or more than 50% of the membrane thickness from the primary-side surface 1 as in the case of gold colloids having a diameter of 50 nm, a case where the absolute value of the spectrum of variation in the brightness, determined by subtracting the brightness profile measured from a constant (255) in measurement with an optical microscope, is 10% or less relative to the maximum of the absolute value of the spectrum can be regarded as being within the margin of error.

When a solution containing gold colloids having a diameter of 30 nm is filtered by the virus removal membrane 10, a site where the gold colloids having the diameter of 30 nm are captured in the cross section of the virus removal membrane 10 in a wet state is located at a place corresponding to, for example, 10% or more and 80% or less, or 15% or more and 70% or less of the membrane thickness from the primary-side surface 1 in measurement with an optical microscope. A membrane where the gold colloids having the diameter of 30 nm are captured at a site corresponding to less than 10% of the membrane thickness from the primary-side surface causes viruses and impurities to be captured at a position closer to the primary-side surface of the membrane and may cause clogging to more occur. A membrane where the gold colloids having the diameter of 30 nm are captured at a site corresponding to more than 80% of the membrane thickness from the primary-side surface causes the target viruses to be captured at a position closer to the secondary-side surface of the membrane and thus there is a possibility that the viruses cannot be captured.

Herein, even when gold colloids are observed in a region of less than 10% or more than 80% of the membrane thickness from the primary-side surface 1 as in the cases of respective gold colloids having diameters of 50 nm and 40 nm, a case where the absolute value of the spectrum of variation in the brightness, determined by subtracting the brightness profile measured from a constant (255) in measurement with an optical microscope, is 10% or less relative to the maximum of the absolute value of the spectrum can be regarded as being within the margin of error.

When gold colloids are allowed to flow in the thickness direction from the primary-side surface towards the secondary-side surface, a site where the gold colloids are captured may be formed continuously or intermittently in the thickness direction depending on the membrane structure. In the virus removal membrane according to the embodiment, the site where the gold colloids having the diameter of 50 nm are captured is preferably formed continuously, the site where the gold colloids having the diameter of 40 nm are captured is preferably formed continuously, and the site where the gold colloid having the diameter of 30 nm are captured is preferably formed continuously, from the inside of the primary-side surface towards the inside of the secondary-side surface. When the site where the gold colloids are captured is formed continuously in the flowing direction without any discontinuity, clogging hardly occurs.

The capture position of each of respective gold colloids having diameters of 50 nm, 40 nm and 30 nm is consistently measured with respect to the gold colloids captured by the membrane. Accordingly, gold colloids that are not captured by the membrane and that have permeated through the membrane is not subjected to such measurement. In other words, the capture position of every gold colloid allowed to permeate through the membrane is not measured, but the capture position of the gold colloids captured by the membrane, on the membrane, is measured.

When a solution containing gold colloids having a diameter of 20 nm is filtered by the virus removal membrane 10, almost no gold colloids having the diameter of 20 nm are captured in the cross section of the virus removal membrane 10. This can be confirmed from the following: the spectrum of the brightness cannot be significantly detected in observation using an optical microscope (Biozero, BZ 8100, manufactured by Keyence Corporation). This can also be confirmed from a reduction in a logarithmic removal rate. Herein, no gold colloids having the diameter of 20 nm being captured indicate that not only a useful protein having a diameter of about 10 nm, such as IgG (molecular weight: about 150000), but also useful proteins high in molecular weight, such as fibrinogen (molecular weight: 340000) and IgM (molecular weight: 900000) can permeate at high permeability while removal of viruses is achieved.

The material of the virus removal membrane 10 includes cellulose. As such cellulose, regenerated cellulose, native cellulose, cellulose acetate or the like can be used. Examples of the method for manufacturing regenerated cellulose include a method for manufacturing regenerated cellulose from a cuprammonium cellulose solution (cuprammonium method) and a method for manufacturing regenerated cellulose by saponification of cellulose acetate by an alkali (saponification method).

Figure 4:
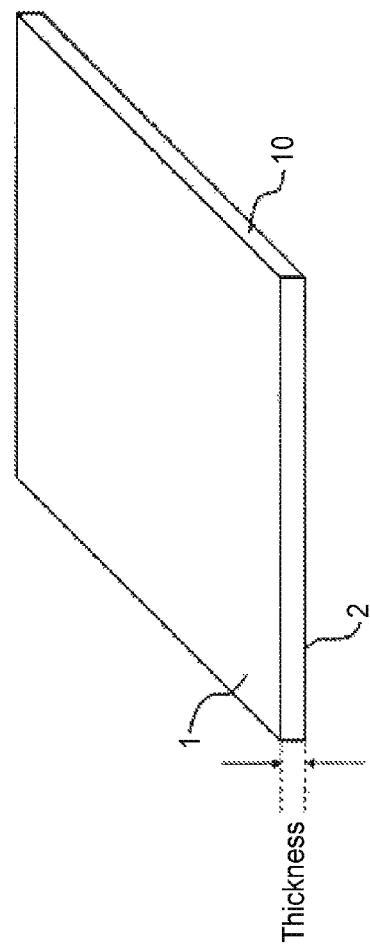
FIG. 4 is a schematic view of a virus removal membrane having a flat membrane shape, according to an embodiment of the present invention.

The virus removal membrane 10 has, for example, a hollow fiber membrane shape. Alternatively, the virus removal membrane 10 may have a flat membrane shape as illustrated in FIG. 4. A hollow fiber membrane can be packed in a container to make a compact filter, even when it has a large membrane area.

The thickness of the virus removal membrane 10 illustrated in FIG. 1 is, for example, 25.0 µm or more and 45.0 µm or less, or 30.0 µm or more and 40.0 µm or less, in a dry state. The standard deviation of the membrane thickness is 5.0 µm or less, or 4.0 µm or less. A membrane thickness of less than 25 µm may result in a reduction in strength of the membrane to cause the membrane not to withstand the filtration pressure, and a membrane thickness of more than 45 µm may result in a reduction in filtration rate. A standard deviation of the membrane thickness of more than 5.0 µm tends to cause the membrane thickness variation to be large, to result in degradation of uniformity.

The inner diameter of the virus removal membrane 10 is, for example, 250 µm or more and 400 µm or less, or 300 µm or more and 360 µm or less, in a dry state. The standard deviation of the inner diameter is 15.0 µm or less, or 10.0 µm or less. An inner diameter of less than 250 µm may increase the pressure loss in the inlet of a hollow fiber and/or in the hollow fiber, resulting in a reduction in filtration rate, and an inner diameter of more than 400 µm tends to increase the volume of a hollow portion serving as a dead space, resulting in an increase in the filter size. A standard deviation of the inner diameter of more than 15.0 µm tends to increase the variation of the structure of the hollow fiber membrane, resulting in degradation of uniformity of the gold colloid capture position.

The pore size of a pore in the virus removal membrane 10 is, for example, 32.0 nm or more and 38.0 nm or less, or 32.0 nm or more and 37.0 nm or less. A pore size of less than 32 nm may result in a reduction in filtration rate, and a pore size of more than 38 nm may cause virus leakage. The pore size of the pore in the cross section of the virus removal membrane 10 is decreased and then increased from the primary-side surface towards the secondary-side surface. For example, the virus capture site encompasses a portion where the pore size of the pore is a minimum value, in the cross section of the virus removal membrane 10. For example, the site where the gold colloids having the diameter of 30 nm are captured is a portion where the pore size of the pore is the minimum value.

The pure water permeation rate measured in the virus removal membrane 10 is, for example, 100 $L/m^2/hrs/0.1$ MPa or more and 500 $L/m^2/hrs/0.1$ MPa or less, 100 $L/m^2/hrs/0.1$ MPa or more and 400 $L/m^2/hrs/0.1$ MPa or less, or 150 $L/m^2/hrs/0.1$ MPa or more and 300 $L/m^2/hrs/0.1$ MPa or less.

The logarithmic removal rate (LRV: Logarithmic Reduction Value) of viruses having a diameter of 40 nm or more by the removal membrane 10 is, for example, 4.00 or more, 4.50 or more, 5.00 or more, or 5.50 or more. As the LRV is higher, viruses are more removed. It is considered that a LRV of 5.50 or more hardly causes virus leakage.

The LRV of bovine viral diarrhea viruses (BVDV) by the virus removal membrane 10 is, for example, 4.00 or more, 4.50 or more, 5.00 or more, or 5.50 or more. As the LRV is higher, BVDV is more removed. It is considered that a LRV of 5.50 or more hardly causes BVDV leakage.

The logarithmic removal rate (LRV) of the gold colloids having the diameter of 40 nm by the virus removal membrane 10 is, for example, 1.00 or more, 1.20 or more, or 1.40 or more. The logarithmic removal rate of the gold colloids having the diameter of 30 nm by the virus removal membrane 10 is, for example, 1.00 or more, 1.20 or more, or 1.40 or more. The logarithmic removal rate of the gold colloids having the diameter of 20 nm by the virus removal membrane 10 is, for example, less than 0.10.

The fracture strength of the virus removal membrane 10 is, for example, 0.28 MPa or more, 0.30 MPa or more, or 0.32 MPa or more. When the fracture strength is 0.28 MPa or less, there is a possibility that the virus removal membrane cannot withstand the filtration pressure. When the fracture strength is low, the pore structure may be deformed by the filtration pressure, resulting in degradation of virus capture capability.

Figure 5:
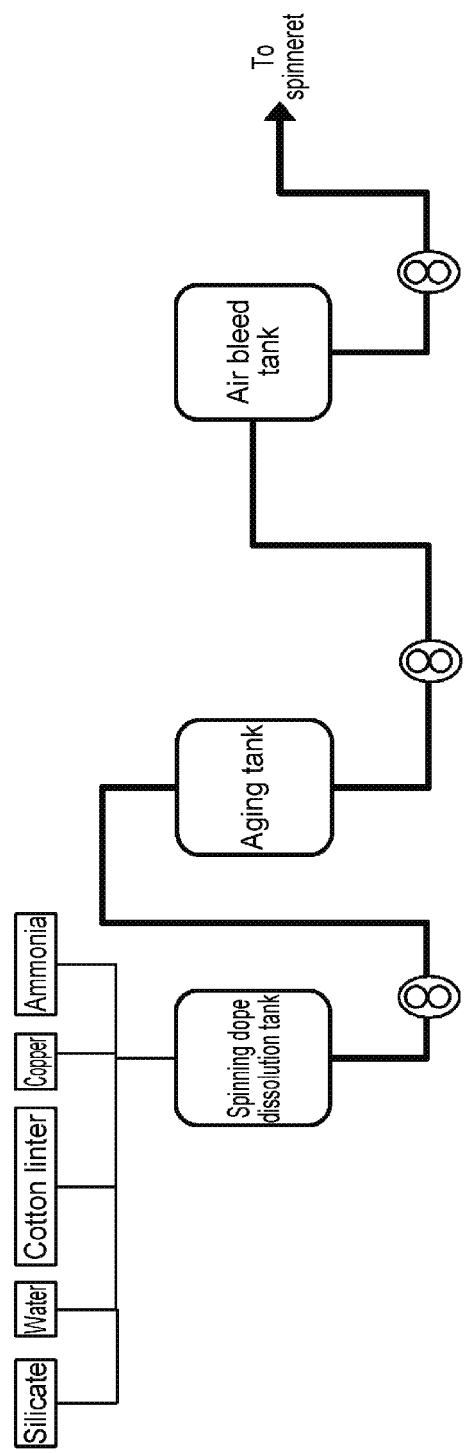
FIG. 5 is a schematic diagram illustrating a manufacturing process of a virus removal membrane according to an embodiment of the present invention.

The virus removal membrane according to the embodiment, having properties described above, is manufactured by, for example, a method described below. When a virus removal membrane in the form of a hollow fiber membrane is manufactured, first, a cellulose cuprammonium solution is prepared in which cellulose is dissolved in a cuprammonium solution and the cellulose concentration is, for example, 6.0% by weight or more and 8.5% by weight or less, 7.0% by weight or more and 8.5% by weight or less, or 7.0% by weight or more and 8.0% by weight or less, and silicate is added thereto to provide a raw spinning solution. As illustrated in FIG. 5, addition of silicate may be conducted before or at the same time as dissolution of cellulose in the cuprammonium solution. As the silicate, any of silicates of sodium, potassium, calcium and magnesium can be used. Among them, silicates of sodium and potassium are preferable, and sodium metasilicate is more preferable.

The amount of the added silicate is set so that the silicon dioxide concentration in the cellulose cuprammonium solution is, for example, 5 ppm or more and 100 ppm or less, 5 ppm or more and 70 ppm or less, or 5 ppm or more and 60 ppm or less. The ratio of the copper concentration to the cellulose concentration is, for example, 0.30 or more and 0.40 or less. The ratio of the ammonia concentration to the cellulose concentration is, for example, 0.6 or more and 1.0 or less.

Next, the raw spinning solution is warmed at a constant temperature to perform aging of the raw spinning solution. The aging temperature is 30° C. or higher and 40° C. or lower, 30° C. or higher and 37° C. or lower, or 30° C. or higher and 35° C. or lower, and the aging time is 45 hours or more and 100 hours or less, more preferably 48 hours or more and 96 hours or less. The aging temperature is, for example, constant within the above range. When the aging temperature is higher than 40° C. and/or the aging time is more than 100 hours, copper oxide may be generated in the cellulose solution to cause structure defects to occur during membrane formation. Examples of the warming method include a method where room temperature is set to the aging temperature and a method where a heat exchanger is used. As the heat exchanger, for example, jacket type, double tube type, shell and tube type, and plate type heat exchangers can be used. The aging of the raw spinning solution may be performed with the raw spinning solution being sent into a piping or may be performed with the raw spinning solution being retained in a storage tank.

Next, a solution as a coagulation solution is prepared which includes at least one organic solvent having no hydroxyl group, having a solubility in an aqueous 28% by weight ammonia solution, of 10% by weight or more, and not swelling cellulose, and which generates microphase separation to the raw spinning solution. The microphase separation is described below. For example, the coagulation solution includes acetone, ammonia and water. When a hollow fiber membrane is manufactured, an internal coagulation solution and an external coagulation solution are prepared as described below. The internal coagulation solution has, for example, an acetone concentration of about 40% by weight or more and about 60% by weight or less, and an ammonia concentration of about 0.5% by weight or more and about 1.0% by weight or less. The external coagulation solution has, for example, an acetone concentration of about 30% by weight or more and about 50% by weight or less and an ammonia concentration of about 0% by weight or more and about 0.2% by weight or less.

Next, the raw spinning solution is discharged through an annular double spinneret at a constant rate of 1.5 cc/min or more and 8.0 cc/min or less, and at the same time, the internal coagulation solution is discharged through a center spinning outlet provided on the center of the annular double spinneret. The raw spinning solution and the internal coagulation solution discharged are immediately immersed in the external coagulation solution in a coagulation bath. Here, microphase separation occurs in the raw spinning solution by the action of the internal and external coagulation solutions. Such microphase separation means that a cellulose concentration phase is separated as particles having a diameter of 0.01 to several μm from a solvent or a cellulose dilution phase, and dispersed and stabilized. The microphase separation first occurs at the interface between the raw spinning solution, and the internal and external coagulation solutions, and also gradually occurs in the interior of the raw spinning solution. The particles formed by the microphase separation are formed into large particles with repeatedly colliding and coalescing. At the same time, the particles are gradually solidified by the action of the coagulation solution, and formed into a hollow fiber membrane having a polymer porous structure where the particles are three-dimensionally linked. The hollow fiber membrane formed is wound up.

When the coagulation bath is formed by a narrow tube, the flow rate of the raw spinning solution in the coagulation bath is, for example, 5 m/min or more and 20 m/min or less, 8 m/min or more and 15 m/min or less, or 9 m/min or more and 12 m/min or less. The flow rate of the raw spinning solution in the coagulation bath is equal to the wind-up rate (spinning rate) of the hollow fiber membrane formed. The flow rate of the external coagulation solution to be sent to the coagulation bath is, for example, 50 cc/min or more and 500 cc/min or less, 60 cc/min or more and 300 cc/min or less, or 70 cc/min or more and 150 cc/min or less.

The hollow fiber membrane wound-up is immersed in 2% by weight or more and 10% by weight or less of diluted sulfuric acid, and thereafter washed with pure water. Thus, cellulose is regenerated. Furthermore, the water content of the hollow fiber membrane is replaced with an organic solvent. As the organic solvent, methanol, ethanol, acetone, and the like can be used. Thereafter, both ends of a hollow fiber membrane bundle are secured and stretched by 1% to 8%, and thereafter the hollow fiber membrane bundle is dried at 30° C. or higher and 60° C. or lower under a reduced pressure of 5 kPa or less to provide a virus removal membrane in the form of a hollow fiber membrane, according to the embodiment.

The cellulose cuprammonium solution is oxidized and disintegrated by contact with air introduced during cellulose dissolution and/or oxygen included in the cuprammonium solution, resulting in a reduction in the degree of polymerization to result in a reduction in the viscosity. Therefore, the viscosity variation is caused in the raw spinning solution being sent by a piping. When the viscosity variation is caused in the raw spinning solution, pulsation or the like may occur in the flow of the raw spinning solution in the piping to thereby affect discharge stability of the raw spinning solution through the annular double spinneret, thereby causing the variations in the thickness in the fiber length direction and the hollow fiber diameter of the hollow fiber membrane formed, resulting in fiber cutting. Furthermore, when the viscosity variation is caused in the raw spinning solution, the variation or the like in the amount of discharge of the raw spinning solution may be caused in the circumferential direction of the spinneret, thereby causing the variations in the thickness in the circumferential direction and the hollow fiber diameter of the hollow fiber membrane formed, also resulting in the variation in the membrane structure in the circumferential direction. The degree of polymerization also has an effect on the coagulation rate of the raw spinning solution. Therefore, when the variation in the degree of polymerization is large in the raw spinning solution, the variation in the coagulation rate of the raw spinning solution is caused. When the variation in the coagulation rate is caused, the variation in a membrane structure formed is caused to result in an increase in the pore size distribution. As a result, the gradient structure of the pore size is broad. This leads to, for example, an increase in the thickness of a site where gold colloids having a diameter of 30 nm or more and 40 nm or less are captured. On the contrary, the present inventors have made intensive studies, and as a result, have found that a cellulose cuprammonium solution after dissolution of cellulose can be aged to thereby inhibit the cellulose cuprammonium solution from being oxidized and disintegrated during feeding by a piping, resulting in a reduction in the viscosity variation. Therefore, the cellulose cuprammonium solution can be aged to thereby enhance discharge stability of a raw spinning solution through an annular double spinneret, resulting in formation of a hollow fiber membrane having a membrane structure small in the inner diameter variation and the thickness variation and also uniform in the circumferential direction. Moreover, the variation is small to also result in an enhancement in fracture resistance strength of the hollow fiber membrane.

Furthermore, the present inventors have found that silicon dioxide can be added into the cellulose cuprammonium solution to thereby inhibit copper oxide from being generated by aging. When the raw spinning solution is warmed in aging, copper oxide is generated. Copper oxide is a solid foreign substance, and thus, when membrane formation is made with copper oxide being incorporated in the raw spinning solution, dissolution of copper oxide is caused in a subsequent step of regeneration by an acid, to cause defects to occur in the membrane structure. Therefore, copper oxide causes the variation in the pore size in the circumferential direction. In an extreme case, copper oxide causes formation of pinholes in the membrane and causes the occurrence of structure defects such as macrovoids. Accordingly, both of aging of the cellulose cuprammonium solution and adding of silicon dioxide can be performed to thereby stably produce the virus removal membrane according to the present embodiment.

When copper oxide is attached to a discharge port of the annular double spinneret, a flow passage may be partially contaminated and/or occluded to form a hollow fiber having a partially thinner thickness and having an uneven thickness, or a hollow fiber having a shape where a streak is partially made. Therefore, copper oxide decreases the bubble point and virus removal capability of a hollow fiber membrane formed. On the contrary, silicon dioxide forms a complex together with copper and inhibits copper oxide from being generated, and therefore silicon dioxide can be added to the cellulose cuprammonium solution to thereby inhibit copper oxide from being generated and at the same time perform aging of the cellulose cuprammonium solution. Moreover, the thickness of a virus removal membrane formed can be uniform to thereby enhance the membrane strength and suppress the occurrence of leakage in filtration and pressurizing. If the amount of silicon dioxide is too large, however, silicon dioxide may also act as a foreign substance and therefore the silicon dioxide concentration is preferably 100 ppm or less.

A virus removal membrane in the form of a flat membrane is manufactured by, for example, the following method. Silicate is added to a cuprammonium cellulose solution and mixed therewith to provide a membrane formation solution. Subsequently, the membrane formation solution is aged and thereafter the membrane formation solution is subjected to filtration and a degassing treatment.

Next, the membrane formation solution is cast on a support traveling in a coagulation bath and subjected to flow-casting, and coagulated. The movement rate of the support is about 1.0 to 10.0 m/min. A flat membrane formed is subjected to a regeneration treatment with an acid, thereafter allowed to pass through an additional water bath and drawn out, and thereafter dried using a drier.

The hollow fiber, and the virus removal membrane in the form of a flat membrane, manufactured by the above methods, can be used to create a filter where a primary space closer to an inlet for a solution to be subjected to filtration and a secondary space closer to an outlet for a permeate are partitioned by a membrane.

Although the present invention is described with reference to embodiments as above, the description and the drawings serving as a part of this disclosure are not to be understood to limit this invention. Various alternative embodiments, examples and operation techniques should be apparent for those skilled in the art from the disclosure. It is to be understood that the present invention encompasses various embodiments and the like not described herein.

Example 1

(Manufacturing of Virus Removal Membrane)

A cotton linter (average molecular weight: $1.44 \times 10^5$) and sodium metasilicate (Kishida Chemical Co., Ltd.) were dissolved in a cuprammonium solution prepared by a known method, to prepare a cuprammonium cellulose solution having a silicon dioxide concentration as described in FIG. 6, a cellulose concentration of 7.0% by weight, an ammonia concentration of 4.5% by weight and a copper concentration of 2.5% by weight. The ratio of the copper concentration to the cellulose concentration was 0.36. The ratio of the ammonia concentration to the cellulose concentration was 0.64.

Next, the cuprammonium cellulose solution was aged in a jacket type, warmable storage tank at a temperature for a retention time as described in FIG. 6. Thereafter, the cuprammonium cellulose solution was defoamed to provide a raw spinning solution.

Next, the raw spinning solution was discharged at 3.65 cc/min through an outer spinning outlet of an annular double spinneret, and at the same time, an internal coagulation solution including acetone/ammonia/water at a weight ratio represented in FIG. 6 was discharged at 1.8 cc/min through a center spinning outlet of the annular double spinneret. The raw spinning solution and the internal coagulation solution discharged through the annular double spinneret were introduced into a coagulation bath filled with an external coagulation solution including acetone/ammonia/water at a weight ratio represented in FIG. 6, to form a hollow fiber membrane, and the hollow fiber membrane was wound up at a wind-up rate (spinning rate) of 10 m/min. As the coagulation bath, a U-shaped funnel narrow tube having a diameter of 7 mm, described in Japanese Patent Laid-Open No. H04-371221, was used, and the flow rate of the external coagulation solution was 2.6 m/min.

The hollow fiber membrane was wound up in water at 30° C. After the hollow fiber membrane was wound up for 120 minutes, the hollow fiber membrane wound up was immersed in separate water at 30° C. for 60 minutes. Thereafter, cellulose of the hollow fiber membrane was regenerated by an aqueous 3% by weight sulfuric acid solution, and further washed with water. Furthermore, the water content of the hollow fiber membrane bundle was replaced with methanol. Thereafter, while both ends of the hollow fiber membrane bundle were secured and the hollow fiber membrane bundle was stretched by 5.0%, the hollow fiber membrane bundle was dried in vacuum under conditions of 50° C. and 3 kPa. The hollow fiber membrane obtained by the foregoing method was formed into a virus removal membrane according to each Example. A virus removal membrane according to each Comparative Example was also manufactured under manufacturing conditions where the aging conditions were changed or under manufacturing conditions where the silicon dioxide concentration was changed, as represented in FIG. 6.

(Physical Properties of Virus Removal Membrane)

(1) Inner Diameter and Thickness (Dry Hollow Fiber)

A cross-sectional piece perpendicular to the fiber length direction, of each of 10 of any dry hollow fibers in the fiber bundle wound up for 120 minutes, was observed by a projector (V-12B, manufactured by Nikon Corporation), and measurement of the inner diameter and that of the thickness were made at two points and at four points, respectively, in the longitudinal direction and the lateral direction with respect to one hollow fiber cross section, and the respective averages were defined as the measurement values of the inner diameter and the thickness. The average inner diameter, the standard deviation of the inner diameter, the average thickness and the standard deviation of the thickness of the resulting virus removal membrane according to each of Examples and Comparative Examples were as represented in FIG. 7.

(2) Pure Water Permeation Rate Before Sterilization

The pure water permeation rate was determined by filling both sections of the membrane, located at the primary-side surface where a solution is to be applied and the secondary-side surface where a permeate is to be flowed, with pure water, thereafter filtering pure water at a temperature of 25° C. at a transmembrane pressure difference of 20 kPa, and converting the amount of permeation of pure water coming out through the primary-side surface towards the secondary-side surface, to the unit (L/hrs/0.1 MPa per square meter of the membrane area of the dry hollow fiber). Herein, pure water means water purified by ultrafiltration. The pure water permeation rate of the resulting virus removal membrane according to each of Examples and Comparative Examples was as represented in FIG. 7.

(3) Average Pore Size

The porosity "Pr" was calculated according to the following method. The apparent density pa of the hollow fiber was determined from the measurement values of the thickness, the area and the weight by use of the following expression (2), and furthermore the porosity "Pr" (%) was determined by use of the following expression (3).

$$\rho a = Wd/Vw = 4Wd/\pi l(Do^2 - Di^2) \quad (2)$$

$$Pr(\%) = (1 - \rho a/\rho p) \times 100 \quad (6) \quad (3)$$

Here, $\rho a$ represents the apparent density (g/cm$^3$) of the hollow fiber, "Wd" represents the bone-dry weight (g) of the hollow fiber, "Vw" represents the apparent volume (cm$^3$) of the hollow fiber, "l" represents the length (cm) of the hollow fiber, "Do" represents the outer diameter (cm) of the hollow fiber, "Di" represents the inner diameter (cm) of the hollow fiber, and $\rho p$ represents the density (g/cm$^3$) of cellulose.

The average pore size was calculated according to the following method. Ten fibers were bundled to make a module so that the effective length was 16 cm. One end of the module was closed, the other end thereof was subjected to application of a pressure of 200 mmHg, and water was allowed to pass at 37° C. The amount of water coming out through the membrane was measured as the amount of permeation of water. The inner diameter and the thickness were measured in a dry state in advance, and the membrane area was calculated from these values. The average pore size (nm) was calculated by use of the following expression (4).

$$2r = 2 \times 10^3 \times \sqrt{(V \cdot d \cdot \mu / P \cdot A \cdot Pr)} \quad (4)$$

Here, "2r" represents the average pore size (nm), "V" represents the amount of permeation of water (mL/min), "d" represents the thickness (μm), μ represents the viscosity (cp) of water, "P" represents the pressure difference (mmHg), "A" represents the membrane area (cm$^2$), and "Pr" represents the porosity (%). The above measurement method was made with reference to the measurement method described in Japanese Patent No. 2707274. The average pore size of the resulting virus removal membrane according to each of Examples and Comparative Examples was as represented in FIG. 7.

(4) Bubble Point

When a membrane is wetted by a liquid having a surface tension γ (N/m) and thereafter pressure is gradually applied to the membrane by gas, air bubbles are continuously generated from the membrane surface at a certain pressure. The gas pressure here is called the bubble point (MPa). In any known bubble point measurement method, the pressure at which generation of continuous air bubbles is visually confirmed is defined as the bubble point. Such a determination method, however, causes an error to easily occur because the amount of air bubbles to be generated is small and air bubbles may be overlooked in the case of a small membrane area, and air bubbles (not air bubbles generated by an interfacial fracture phenomenon) attached on the membrane surface before pressurizing, which are left from the membrane surface, may be mistaken as air bubbles by an interfacial fracture phenomenon.

In the present Example, in order to allow the measurement error to be smaller, the pressure (MPa) at which air bubbles were generated at a quantitative rate of 3.0 mL/min per square centimeter of the membrane area was defined as the bubble point. Perfluorocarbon having a surface tension of 0.012 (N/m) (FX3250, manufactured by 3M) was used as a wetting solution, and nitrogen was used as a pressurizing gas. The above measurement method was made with reference to the measurement method described in International Publication No. WO 2001/014047. The bubble point determined of the virus removal membrane according to each of Examples and Comparative Examples was as represented in FIG. 7.

(5) Fracture Strength

The virus removal membrane according to each of Examples and Comparative Examples was used to produce a module made of one fiber having an effective length of 9 cm. The module manufactured was immersed in water at 25° C., one end of the hollow fiber membrane was occluded, and pressure was applied by nitrogen from other end. The pressure applied was gradually increased, and the pressure where the hollow fiber was fractured was defined as the fracture strength of the hollow fiber. The fracture strength determined of the virus removal membrane according to each of Examples and Comparative Examples was as represented in FIG. 7.

(Evaluation of Virus Removal Membrane Using Gold Colloids)

(1) Preparation of Gold Colloid Solution

Respective solutions including gold colloids having particle sizes of 20, 30, 40, and 50 nm (manufactured by Cytodiagnostics Inc.) were purchased. Next, each of the gold colloid solutions was diluted with distilled water for injection, polyoxyethylene-naphthyl ether (1.59% by vol), and poly(sodium 4-styrenesulfonate) (0.20% by vol) so that the absorbance at the maximum absorption wavelength of the gold colloids of each of the gold colloid solutions, measured by an ultraviolet-visible spectrophotometer (UVmini-1240, manufactured by Shimadzu Corporation), was 0.25.

(2) Filtration of Gold Colloid Solution 40 mL of each of the gold colloid solutions prepared was filtered under a pressure of 78.4 kPa by the virus removal membrane manufactured in each of Examples and Comparative Examples. The filtration surface area of the virus removal membrane was 0.001 m$^2$. Herein, one gold colloid solution was allowed to flow with respect to one virus removal membrane.

(3) Removal Rate of Gold Colloids by Virus Removal Membrane

With respect to each of the gold colloid solutions, the absorbance "A" of the gold colloid solution before filtration and the absorbance "B" of the filtrate, at the maximum absorption wavelength of gold colloids, were measured using an ultraviolet-visible spectrophotometer UVmini- 1240 (manufactured by Shimadzu Corporation), and the logarithmic removal rate (LRV) of the gold colloids by the virus removal membrane according to each of Examples and Comparative Examples, given by the following expression (5), was calculated. The results are represented in FIG. 8.

$$LRV = \log_{10}(A/B) \quad (5)$$

(4) Uniformity of Gold Colloid Capture Site (Variation Coefficient)

A piece (thickness: 8 μm) was cut out from the virus removal membrane according to each of Examples and Comparative Examples after filtration of each of the gold colloid solutions, and the brightness profile at each of 240 points stained by the gold colloids in the cross section of the piece was measured by an optical microscope (Biozero, BZ8100, manufactured by Keyence Corporation). Next, the brightness profile measured was subtracted from a constant (255). Thereafter, a graph with the membrane thickness (percentage) represented on the horizontal axis and variation in the brightness represented on the vertical axis was created, and the area of the spectrum of variation in the brightness presented on the graph was calculated. Furthermore, the value obtained by dividing the standard deviation of the area of the spectrum of variation in the brightness at 240 points by the average of the area of the spectrum of variation in the brightness at 240 points was calculated as the value indicating the variation coefficient of the amount of the gold colloids captured on the gold colloid capture site in the virus removal membrane according to each of Examples and Comparative Examples. The results in flowing of only gold colloids having the diameter of 30 nm are represented in FIG. 8. The virus removal membrane according to each Example tended to be low in variation coefficient as compared with the virus removal membrane according to each Comparative Example. Accordingly, it was indicated that uniformity of the amount of the gold colloids captured on the gold colloid capture site of the virus removal membrane according to each Example was high. This indicates that uniformity of the amount of viruses captured on the virus removal membrane according to each Example is high.

(5) Thickness of Gold Colloid Capture Site

A piece (thickness: 8 μm) was cut out from the virus removal membrane in a wet state with which the respective solutions of gold colloids having diameters of 30 and 40 nm were filtered. The brightness profile at each of 240 points stained by the gold colloids in the cross section of the piece in a wet state was measured by an optical microscope (Biozero, BZ8100, manufactured by Keyence Corporation). Here, a first distance "a2" from the primary-side surface of the virus removal membrane to a part where the gold colloids were captured and where was closest to the primary-side surface was measured in the thickness direction. In addition, a second distance "b" from the primary-side surface of the virus removal membrane to a part where the gold colloids were captured and where was closest to the secondary-side surface was measured in the thickness direction.

Next, the value "A" (=a/c (expressed in percentage)) obtained by division of the first distance "a" by the thickness "c" of the virus removal membrane in a wet state and expressed in percentage was calculated at each of 240 points, and the average of the value "A" at 240 points was calculated as a first attainment level. In addition, the value "B" (=b/c (expressed in percentage)) obtained by division of the second distance "b" by the thickness "c" of the virus removal membrane in a wet state and expressed in percent-age was calculated at each of 240 points, and the average of the value "B" at 240 points was calculated as a second attainment level.

Furthermore, as represented in the expression (1), the value obtained by multiplication of the difference between the average "$B_{30}$" of the second attainment level in the virus removal membrane applied to capturing of the gold colloids having the diameter of 30 nm by filtration, and the average "$A_{40}$" of the first attainment level in the virus removal membrane applied to capturing of the gold colloids having the diameter of 40 nm by filtration, by the average "$C_{AVE}$" of the average "$C_{30}$" of the thickness of the wet virus removal membrane applied to capturing of the gold colloids having the diameter of 30 nm by filtration and the average "$C_{40}$" of the thickness of the wet virus removal membrane applied to capturing of the gold colloids having the diameter of 40 nm by filtration was calculated as the thickness "T" of the gold colloid capture site of the virus removal membrane. The results are represented in FIG. 8.

In the above method, at least two virus removal membranes: the virus removal membrane applied to capturing of the gold colloids having the diameter of 30 nm by filtration and the virus removal membrane applied to capturing of the gold colloids having the diameter of 40 nm by filtration; were used to measure the thickness of the dense layer. Only one virus removal membrane, however, can also be used to measure the thickness of the dense layer. In this case, one virus removal membrane was used to filter a gold colloid solution including gold colloids having both diameters of 30 nm and 40 nm. Alternatively, one virus removal membrane was used to filter a gold colloid solution with a diameter of 30 nm and then filter a gold colloid solution with a diameter of 40 nm.

Thereafter, a piece was cut out from the virus removal membrane with which each of the gold colloid solutions with diameters of 30 nm and 40 nm was filtered, and the brightness profile at each of 240 points stained by the gold colloids in the cross section of the piece were measured by an optical microscope (Biozero, BZ8100, manufactured by Keyence Corporation). Herein, a first distance "$a_1$" from the primary-side surface of the virus removal membrane to a part of the gold colloid capture site where was closest to the primary-side surface was measured in the thickness direction. In addition, a second distance "$b_1$" from the primary-side surface of the virus removal membrane to a part of the gold colloid capture site where was closest to the secondary-side surface was measured in the thickness direction.

Next, the value "$A_1$" (=$a_1/c_1$ (expressed in percentage)) obtained by division of the first distance "a1" by the thickness "c" of the wet virus removal membrane and expressed in percentage was calculated at each of 240 points, and the average of the value "$A_1$" at 240 points was calculated as a first attainment level. In addition, the value "$B_1$" (=$b_1/c_1$ (expressed in percentage)) obtained by division of the second distance "$b_1$" by the thickness "c" of the wet virus removal membrane and expressed in percentage was calculated at each of 240 points, and the average of the value "$B_1$" at 240 points was calculated as the second attainment level.

Furthermore, as represented by the following expression (6), the value obtained by multiplication of the difference between the average "$B_1$" of the second attainment level in the virus removal membrane and the average "$A_1$" of the first attainment level in the virus removal membrane, by the average "C" of the thickness of the wet virus removal membrane was calculated as the thickness "T" of the gold colloid capture site of the virus removal membrane. It was confirmed that no large difference occurred between the thickness "T" calculated by the expression (1) and the thickness "T" calculated by the expression (6).

$$T=(B_1-A_1)\times C \quad (6)$$

(6) Particle Size Dependence Property (Gradient Property) of Gold Colloid Capture Site of Virus Removal Membrane A piece (thickness: 8 μm) was cut out from the virus removal membrane with which the gold colloid solutions with each of diameters of 30 nm, 40 nm and 50 nm was filtered. The thickness of the virus removal membrane in a wet state was measured using an optical microscope (Biozero, BZ8100, manufactured by Keyence Corporation). The brightness profile at each of 240 points stained by the gold colloids in the cross section of the piece was measured with an optical microscope (Biozero, BZ8100, manufactured by Keyence Corporation). Here, a first distance "a" from the primary-side surface of the virus removal membrane to a part where the gold colloids were captured and where was closest to the primary-side surface was measured in the thickness direction. In addition, a second distance "b" from the primary-side surface of the virus removal membrane to a part where the gold colloids were captured and where was closest to the secondary-side surface was measured in the thickness direction.

Next, the value "A" (%) obtained by division of the first distance "a" by the thickness "c" of the wet virus removal membrane and expressed in percentage was calculated at each of 240 points, and the average of the value "A" (%) at 240 points was calculated as the first attainment level. In addition, the value "B" (%) obtained by division of the second distance "b" by the thickness "c" of the wet virus removal membrane and expressed in percentage was calculated at each of 240 points, and the average of the value "B" (%) at 240 points was calculated as the second attainment level. The average of the first attainment level and the average of the second attainment level with respect to each of respective gold colloids having the diameters of 30 nm, 40 nm and 50 nm are represented in FIG. 8. In FIG. 8, numerical values on the left each represent the average of the first attainment level, and numerical values on the right each represent the average of the second attainment level. The capture position of each of respective gold colloids having the diameters of 50 nm, 40 nm and 30 nm was consistently measured with respect to the gold colloids captured by the membrane, and the gold colloids not captured by the membrane were not subjected to such measurement.

(Virus Removal Ability of Virus Removal Membrane)

(1) Preparation of Virus-Containing Antibody Solution

A polyclonal antibody (human IgG) (Venoglobulin-IH, manufactured by Japan Blood Products Organization) was used to provide an antibody solution diluted with Dulbecco PBS (−) so that the antibody concentration was 10 mg/mL. To the resulting antibody solution was added 5.0% by vol of bovine viral diarrhea virus (BVDV), and sufficiently stirred to provide a virus-containing antibody solution.

(2) Filtration of Virus-Containing Antibody Solution

The virus removal membrane manufactured, having a membrane area of 0.001 m², was used at a filtration pressure of 78.4 kPa to perform dead-end filtration of the virus-containing antibody solution until the amount of filtration reached 100 L/m². The filtration pressure was measured by a pressure gauge disposed close to a feed solution vessel.

(3) Measurement of Virus Removal Rate

Prepared was MDBK (NBL-1) cell (JCRB 9028) obtained from JCRB Cell Bank and cultured. In addition, a mixed solution of 10% by vol of horse serum (HS, manufactured by Thermo Fisher Scientific Inc.) heated in a water bath at 56° C. for 30 minutes and inactivated, and D-MEM (manufactured by Invitrogen Corporation, high glucose) containing 1% by vol of penicillin/streptomycin (+10000 Units/mL of penicillin, +10000 μg/mL of streptomycin, manufactured by Invitrogen Corporation) was prepared. Hereinafter, the mixed solution is referred to as "10% by vol of HS/D-MEM". Next, MDBK cell was diluted with 10% by vol of HS/D-MEM to prepare a diluted cell suspension having a cell concentration of 2.0×10⁵ (cells/mL). Thereafter, the diluted cell suspension was dispensed to all 96-well flat-bottom cell culture plates (manufactured by Falcon Corporation) by 100 μL.

With respect to the filtrate of the virus-containing antibody solution, 10-fold, 10²-fold, 10³-fold, 10⁴-fold and 10⁵-fold diluted solutions with 10% HS/D-MEM were prepared. In addition, with respect to the virus-containing protein solution not filtered (virus-containing antibody solution) taken immediately before filtration, 10²-fold, 10³-fold, 10⁴-fold, 10⁵-fold, 10⁶-fold and 10⁷-fold diluted solution with 10% HS/D-MEM were prepared.

Each of the filtrate of the virus-containing antibody solution, 10-fold, 10²-fold, 10³-fold, 10⁴-fold and 10⁵-fold diluted solutions of the filtrate, and 10²-fold, 10³-fold, 10⁴-fold, 10⁵-fold, 10⁶-fold and 10⁷-fold diluted solutions of the virus-containing protein solution not filtered was dispensed to every eight wells of each of the cell culture plates, to which the diluted cell suspension was dispensed, by 100 μL. Thereafter, each of the cell culture plates was placed in an incubator at 37° C. in a 5% carbon dioxide atmosphere, and the cell was cultured for three days.

The cell cultured for three days was confirmed about the presence of the cytopathic effect (CPE) by microscope observation, and a well where the cytopathic effect was confirmed was counted as a well with viral infection occurred and a well where the cytopathic effect was not confirmed was counted as a well with no viral infection occurred. Furthermore, the degree of viral infection was confirmed every well, to which each of the filtrate of the virus-containing antibody solution and the diluted solutions of the filtrate, and the diluted solutions of the virus-containing protein solution not filtered was dispensed, the $\log_{10}$ (TCID$_{50}$/mL) was calculated as an infectivity titer according to the Reed-Muench method (see Experimental Study of Viruses, General, edited by National Institute of Infectious Diseases, p. 479-480), and the logarithmic removal rate (LRV) of the viruses was calculated by use of the following expressions (7). The results are represented in FIG. 8. The virus removal membrane according to each Example tended to be higher in the virus removal rate than the virus removal membrane according to each Comparative Example.

$$\mathrm{LRV}=\log_{10}(C_0/C_F) \quad (7)$$

Here, "$C_0$" represents the infectivity titer of the virus-containing protein solution not filtered (virus-containing antibody solution), before filtration by the virus removal membrane, and "$C_F$" represents the infectivity titer of the filtrate after filtration by the virus removal membrane.

REFERENCE SIGNS LIST 1 primary-side surface
2 secondary-side surface
10 virus removal membrane

The invention claimed is:

1. A method for manufacturing a virus removal membrane, comprising:
    an aging process of maintaining a raw spinning solution at 30° C. or higher and 40° C. or lower for 45 hours or more and 100 hours or less, the raw spinning solution comprising a cuprammonium solution in which cellulose and a silicate are dissolved, and the cellulose being selected from the group consisting of regenerated cellulose and native cellulose;
    a membrane formation process of forming a cellulose membrane;
    the membrane formation process comprising discharging the raw spinning solution into a coagulation solution and, in a non-solvent induced phase separation, allowing the raw spinning solution to coagulate to form a hollow fiber membrane; and
    winding-up the hollow fiber membrane to obtain the virus removal membrane.

2. The method for manufacturing the virus removal membrane according to claim 1, wherein a cellulose concentration in the raw spinning solution to be discharged in the membrane formation process is 6.0% by weight or more and 8.5% by weight or less.

3. The method for manufacturing the virus removal membrane according to claim 1, wherein a ratio of a copper concentration to a cellulose concentration in the raw spinning solution to be discharged in the membrane formation process is 0.30 or more and 0.40 or less.

4. The method for manufacturing the virus removal membrane according to claim 1, wherein a silicon dioxide concentration in the raw spinning solution to be discharged in the membrane formation process is 5 ppm or more and 100 ppm or less.

5. The method for manufacturing the virus removal membrane according to claim 1, wherein the raw spinning solution further comprises ammonia, and a ratio of an ammonia concentration to a cellulose concentration in the raw spinning solution to be discharged in the membrane formation process is 0.6 or more and 1.0 or less.

6. The method for manufacturing the virus removal membrane according to claim 1, wherein the raw spinning solution is discharged using an annular spinneret in the membrane formation process.

7. A method for manufacturing a virus removal membrane, comprising:
    providing a cuprammonium solution;
    dissolving cellulose in the cuprammonium solution and adding a silicate to the cuprammonium solution such that a raw spinning solution that contains cellulose, copper, and silicon dioxide is obtained, the cellulose being selected from the group consisting of regenerated cellulose and native cellulose;
    aging the raw spinning solution by maintaining the raw spinning solution at 30° C. or higher and 40° C. or lower for 45 hours or more and 100 hours or less;
    providing a coagulation solution;
    discharging the raw spinning solution into the coagulation solution and allowing the raw spinning solution to coagulate to form a hollow fiber membrane; and
    drying the hollow fiber membrane to obtain the virus removal membrane.

8. The method for manufacturing the virus removal membrane according to claim 1, comprising:
    securing ends of the hollow fiber membrane and stretching the hollow fiber membrane by 1% to 8%,
    after stretching, drying the hollow fiber membrane at 30° C. or higher and 60° C. or lower under a pressure of 5 kPa or less.

9. The method for manufacturing the virus removal membrane according to claim 7, comprising:
    securing ends of the hollow fiber membrane and stretching the hollow fiber membrane by 1% to 8%,
    wherein, after stretching, drying the hollow fiber membrane at 30° C. or higher and 60° C. or lower under a pressure of 5 kPa or less.

* * * * *